C. B. B. LAURÈS.
SPHERICAL GONIOMETER.
APPLICATION FILED MAY 19, 1910.
1,023,858.
Patented Apr. 23, 1912.
3 SHEETS—SHEET 1.
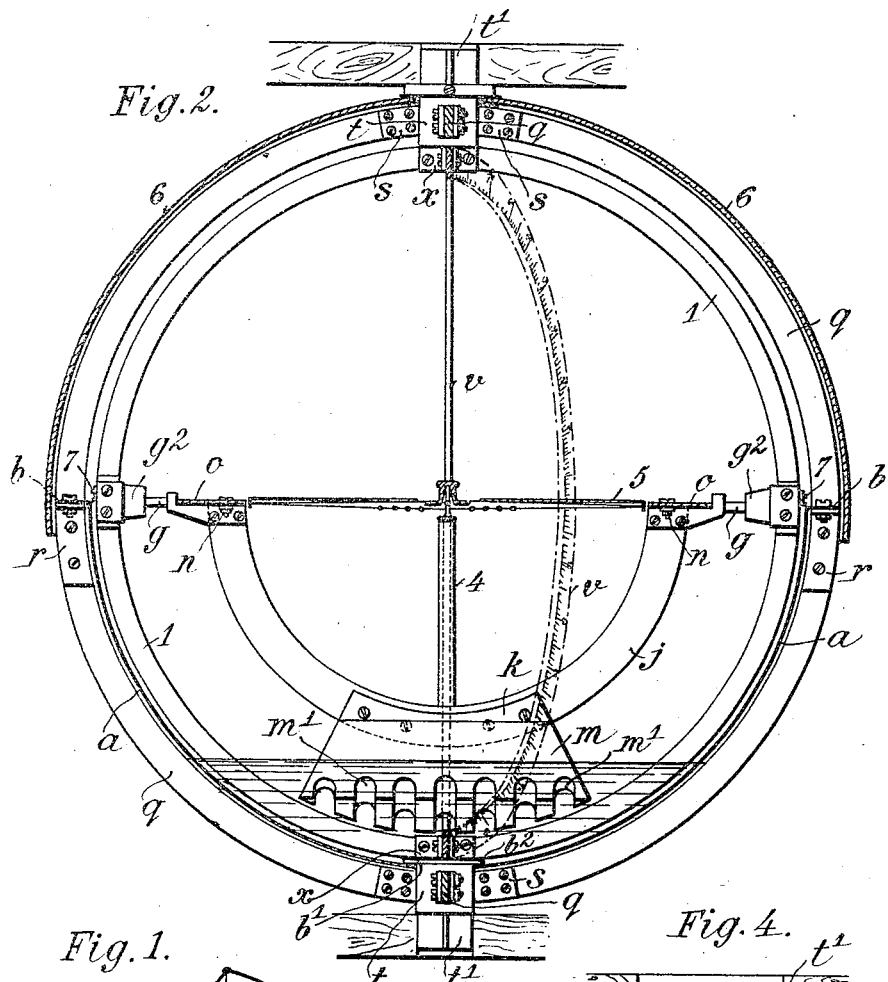
Fig. 2.
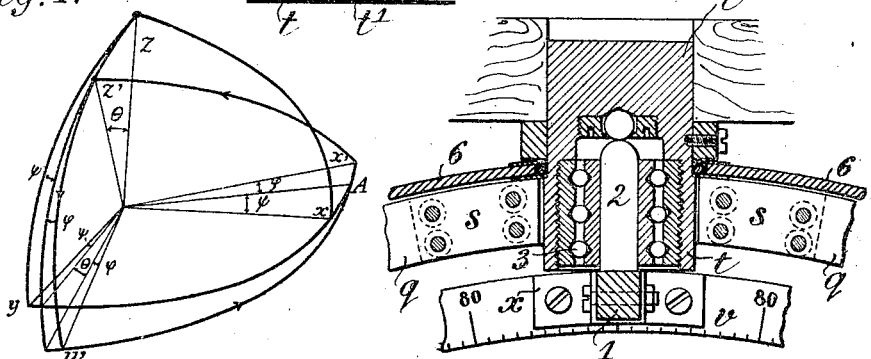
Fig. 1.
Fig. 4.
WITNESSES:
René Bruine
William F. Martinez
INVENTOR
Clément Boniface Basile Laurès
By Attorneys,

C. B. B. LAURÈS.
SPHERICAL GONIOMETER.
APPLICATION FILED MAY 19, 1910.

1,023,858.

Patented Apr. 23, 1912.

3 SHEETS—SHEET 2.

WITNESSES:
René Bruine
William F. Martinez

INVENTOR:
Clément Boniface Basile Laurès
By Attorneys,
Fraser Funk & Nufses

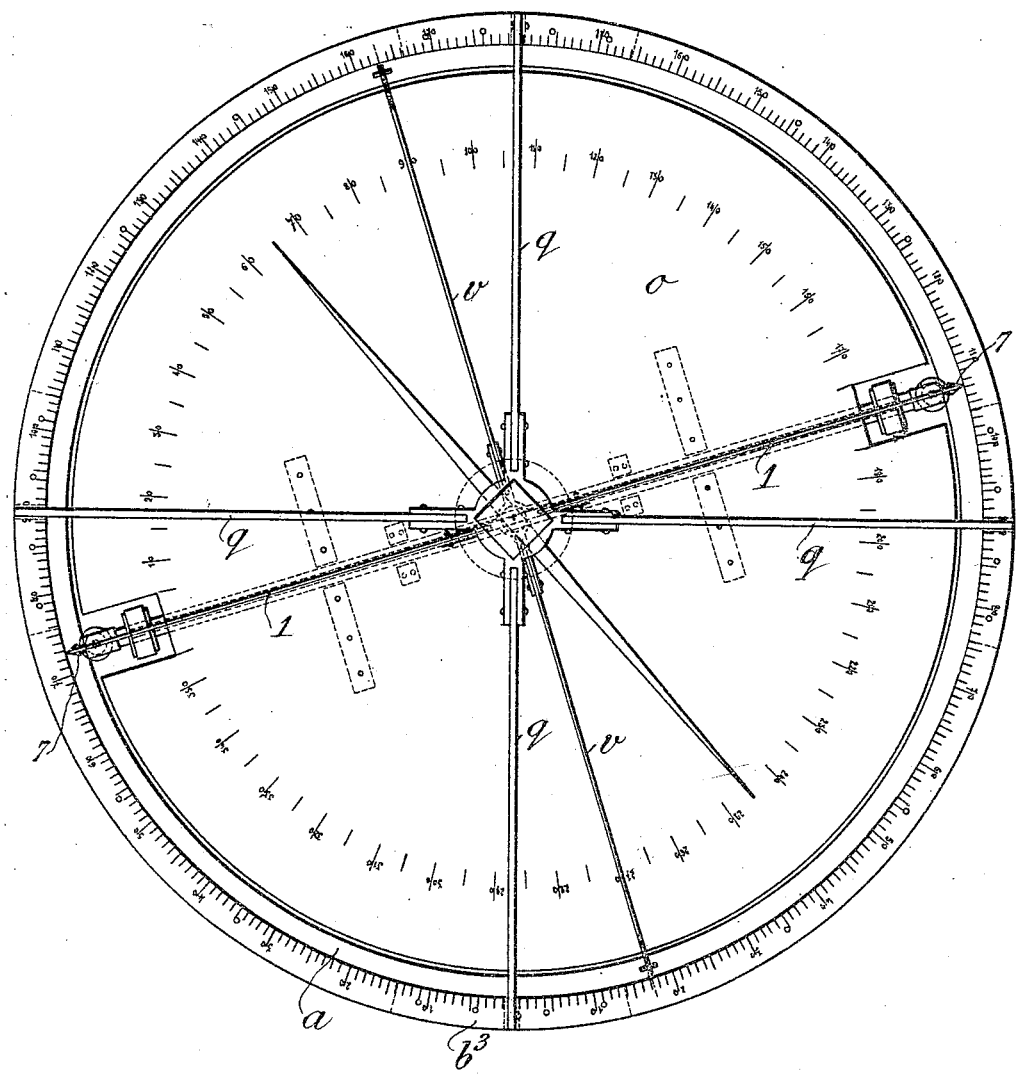

UNITED STATES PATENT OFFICE.

CLÉMENT BONIFACE BASILE LAURÈS, OF PARIS, FRANCE.

SPHERICAL GONIOMETER.

1,023,858.

Specification of Letters Patent. Patented Apr. 23, 1912.

Application filed May 19, 1910. Serial No. 562,304.

*To all whom it may concern:*

Be it known that I, CLÉMENT BONIFACE BASILE LAURÈS, a citizen of the Republic of France, residing in Paris, France, have invented certain new and useful Improvements in Spherical Goniometers, of which the following is a specification.

In mechanics, the movement of rotation of a solid body about its center of gravity is studied with the aid of the three Euler angles $\theta$, $\psi$ and $\varphi$ in two systems of axes having a common origin $o$,—one $o$, $x$, $y$, $z$, fixed and attached invariably to the body $o x y z$, and the other $o$, $x'$, $y'$, $z'$, movable—that is to say the angle $\theta$ is formed by the $o z$ and $o z'$ axes between themselves, and the angles $\psi$ and $\varphi$ are formed by the $o x$ and $o x'$ axes with the line of intersection $o$ A of the plane of $x o y$ with the plane of $x' o y'$.

The plane of $x y$'s of the movable axes is given by a circular disk which is horizontal in all positions of equilibrium of a heavy or gravity system to which it is connected invariably; the plane of $x y$'s of the fixed axes is given by the plane flange or rim of a hollow hemisphere the center of which coincides with the center of the disk.

This goniometer comprises three main parts: 1. A gravity system having two movements of rotation about two axes at right angles to each other and connected together invariably. 2. A fixed part connected invariably to the moving body and formed of four semicircular uprights representing the planes of $zx$'s and $zy$'s of the fixed axes, and two cylindrical parts provided with lugs or projections disposed cross-wise and to which the uprights are screwed. 3. A casing formed of a hollow metal hemisphere and a spherical glass globe.

The following description with reference to the accompanying drawings will enable the manner in which the goniometer may be constructed to be well understood.

Figure 3:
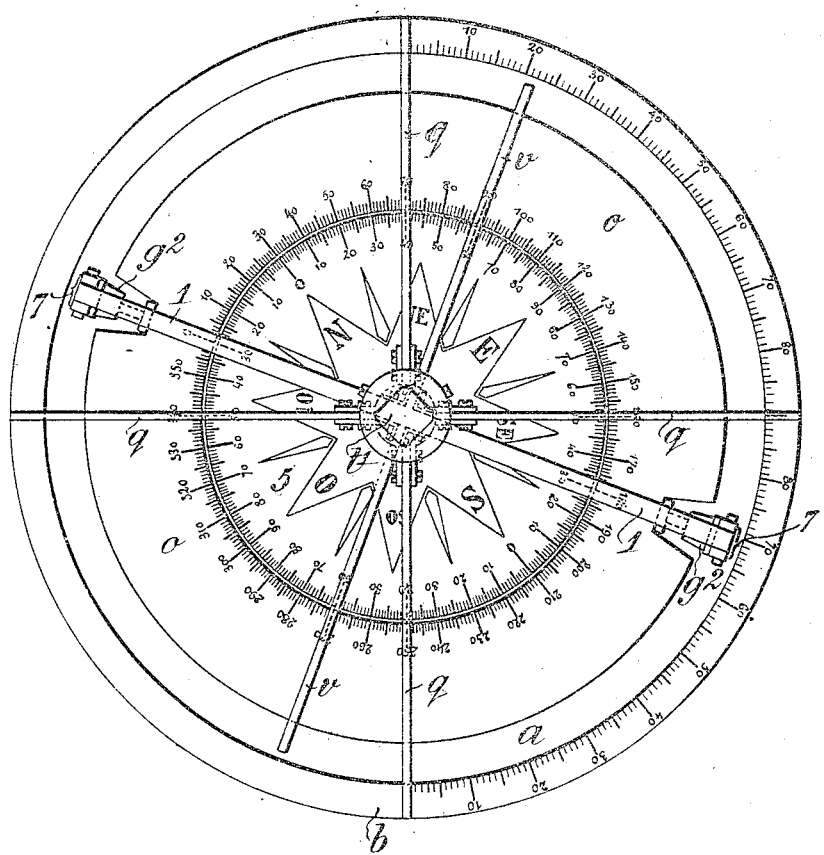
Figure 5:
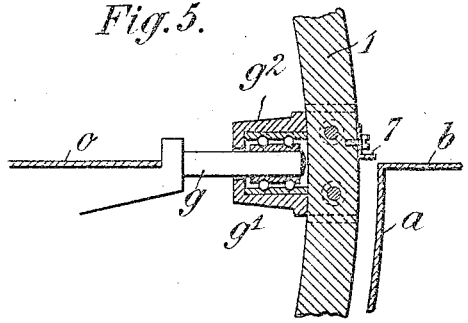

Figure 1 is an explanatory diagram; Fig. 2 is an elevation of the goniometer partly in section. Fig. 3 is a plan thereof. Figs. 4 and 5 show details of the construction of the pivotal connections of the parts on a larger scale. Fig. 6 is a view similar to Fig. 3, illustrating the use of a magnetic needle instead of the compass card illustrated in Fig. 3.

*Gravity system.*—This consists of a mass $m$ of metal, of truncated conical form and having spherical ends. The larger end is formed with parallel grooves $m'$ to assist in damping the oscillations of the mass when the same moves in a bath of oil. The smaller end has two flanges $k$ bolted on a suspension bar $j$ of special shape. The cylindrical ends of this bar form the journals $g$ of the axis of suspension of the mass $m$ and of the bar $j$. These journals are each mounted by means of a collar and a ball bearing $g'$ (Fig 5) in two brasses $g^2$ fixed to a ring 1 of square section so that the axis of suspension coincides with a diameter of said ring. The ring 1 has a cylindrical pivot 2 at each extremity of the diameter perpendicular to the axis of suspension of the heavy mass. These two pivots are likewise provided with collars and ball bearings 3 (Fig. 4), and are fitted in the hollow interior of cylindrical members $t$ of the fixed part. At the middle of the suspension bar $j$ is fixed the pillar or pivot 4 on which is mounted a magnetic compass card 5 which turns in the circular opening of a circular disk $o$ divided into degrees and attached by stays $n$ to the suspension bar $j$ at right angles.

$v$ is a ring divided into degrees and attached at right angles to the ring 1 by four stays $x$; this ring $v$ is shown in one of its positions in dash-dotted lines in Fig. 2. The division of the disk $o$ opposite which the magnetic compass card 5 stops gives the angle $\varphi$, and the division of the ring $v$ opposite which the disk $o$ comes to rest in a position of equilibrium gives $\theta$, the angle of inclination to the horizon.

The magnetic compass card 5 may be replaced by a magnetic needle pivotally mounted on the circular disk $o$ and moving over this disk, which would then have no central opening to receive the card 5. In this case as before, the angle $\varphi$ is given by the division of the disk $o$ opposite which the magnetic needle stops.

*Fixed part.*—This comprises four semicircular uprights $q$ arranged in a circle, spaced equally apart, and screwed to the cruciform lugs or projections $s$ of the two cylindrical members $t$ which have square heads $t'$ for fixing them. The members $t$ are each formed with a cylindrical recess in which are fitted the pivots 2, collars and ball bearings 3 of the ring 1 (see Fig. 4).

*Casing.*—The casing comprises a hollow hemisphere $a$ having a plane flange or rim $b$. This hemisphere is formed with a circular opening $b'$ giving passage to one of the cylindrical members $t$, and it is held on the periphery of this opening and against the cylindrical member $t$ by means of a collar $b^2$ fitting on the member $t$, making a tight joint with the casing. On the flange $b$ is riveted a ring $b^3$ of the same width, divided into degrees for half its circumference. The said flange and ring are attached to the uprights $q$ by stays $r$ obtained by bending at right angles over a diameter, segments of rings of the same diameter as the flange. A glass globe 6 having an opening at top to give passage to one of the cylindrical members $t$, rests on the uprights $q$ and protects the apparatus from drafts and eddies of air. The division of the ring of flange $b$ opposite which the index 7 carried by the ring 1 comes in the position of equilibrium gives the angle $\psi$.

What I claim and desire to secure by Letters Patent is:—

1. A spherical goniometer serving to measure angles of gyration relatively to the horizon and the magnetic meridian in aerial and submarine navigation, and comprising a magnetically responsive element, a gravity system, upon which said magnetically responsive element is mounted, a fixed part and a casing, the gravity system having two movements of rotation about two perpendicular axes attached together invariably and comprising a disk the motion whereof about one of the two axes relatively to the magnetically responsive element gives one of the required Euler angles, $\varphi$, and the motion whereof about the other axis gives the second angle $\theta$, while the motion of the gravity system about the first axis and relatively to the fixed part gives the third angle $\psi$.

2. A spherical goniometer serving to measure angles of gyration relatively to the horizon and the magnetic meridian in aerial and submarine navigation, and comprising a magnetically responsive element, a gravity system, upon which said magnetically responsive element is mounted, and a fixed part, said gravity system comprising a disk movable relatively to said fixed part, a mass of metal suspended from said disk and a bath of oil in which said mass of metal dips for damping the oscillations thereof.

3. A spherical goniometer serving to measure angles of gyration relatively to the horizon and the magnetic meridian in aerial and submarine navigation, and comprising a magnetically responsive element, a gravity system, upon which said magnetically responsive element is mounted, and a fixed part, said gravity system comprising a disk movable relatively to said fixed part, a mass of metal having channels or grooves on its lower part, suspended from said disk and a bath of oil in which said mass of metal dips for damping the oscillations thereof.

4. A spherical goniometer serving to measure angles of gyration relatively to the horizon and the magnetic meridian in aerial and submarine navigation, and comprising a magnetically responsive element, a gravity system, upon which said magnetically responsive element is mounted, a fixed part and a casing, the gravity system having two movements of rotation about two perpendicular axes attached together invariably and comprising a disk the motion whereof about one of the two axes relatively to the magnetically responsive element gives one of the required Euler angles $\varphi$, and the motion whereof about the other axis gives the second angle $\theta$, while the motion of the gravity system about the first axis and relatively to a fixed part gives the third angle $\psi$, said gravity system having a ball bearing between it and the fixed part.

5. A spherical goniometer serving to measure angles of gyration relatively to the horizon and the magnetic meridian in aerial and submarine navigation, and comprising a gravity element, a disk from which said gravity element is suspended, a magnetic element mounted upon and having movement relative to said disk, a frame within which said disk is pivoted and a fixed part in which said frame is pivotally mounted.

6. A spherical goniometer serving to measure angles of gyration relatively to the horizon and the magnetic meridian in aerial and submarine navigation, and comprising a gravity element, a graduated disk from which said gravity element is suspended, a magnetic element mounted upon and having movement relative to said disk, a graduated frame within which said disk is pivoted and a fixed part having graduations thereon in which said frame is pivotally mounted.

7. A spherical goniometer serving to measure angles of gyration relatively to the horizon and the magnetic meridian in aerial and submarine navigation, and comprising a magnetically responsive element, a gravity system upon which said magnetically responsive element is mounted and a fixed part, said gravity system comprising a disk movable relatively to said fixed part, and a mass of metal suspended from said disk.

In witness whereof, I have hereunto signed my name in the presence of two subscribing witnesses.

CLÉMENT BONIFACE BASILE LAURÈS.

Witnesses:
DEAN B. MASON,
GABRIEL BELLIARD.